United States Patent [19]

Rathje

[11] 3,854,880

[45] Dec. 17, 1974

[54] REAGENT FOR THE DETERMINATION OF CALCIUM

[75] Inventor: Werner Rathje, Berlin, Germany

[73] Assignee: Boehringer Mannheim GMBH, Mannheim-Waldhof, Germany

[22] Filed: Aug. 27, 1973

[21] Appl. No.: 392,160

[30] Foreign Application Priority Data
Aug. 30, 1972 Germany............................ 2242966
July 25, 1973 Germany............................ 2337811

[52] U.S. Cl. ............................ 23/230 B, 252/408
[51] Int. Cl. .......................................... G01n 33/16
[58] Field of Search ........ 23/230 B, 230 R; 252/408

[56] References Cited
UNITED STATES PATENTS
3,121,613  2/1964  Bittner ............................. 23/230 B
3,754,865  8/1973  Ginner ............................. 23/230 B
3,798,000  3/1974  Helger............................. 23/230 B Primary Examiner—R. E. Serwin
Attorney, Agent, or Firm—Burgess, Dinklage & Sprung

[57] ABSTRACT

Calcium as, e.g., contained in solutions or body fluids, is determined by contacting same with a novel reagent comprising a solution of murexide (acid ammonium purpurate) in at least one polyvalent (including bivalent) alcohol containing sufficient alkali metal alcoholate to have a pH value of from 10.5 to 13 in aqueous solution.

11 Claims, No Drawings

REAGENT FOR THE DETERMINATION OF CALCIUM

This invention relates to a reagent containing murexide for the colorimetric determination of calcium, and to a method for making such a determination for calcium contained, e.g., in solution or in body fluids.

Murexide (acid ammonium purpurate) of the formula

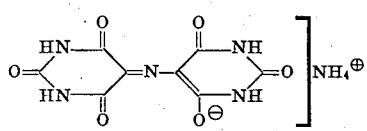

is a known reagent for determining calcium and is commonly used for titrametric determination with the use of complex-forming agents. In many cases the titrametric determination of calcium, however, is deficient, especially when attempting to adapt the method to automation and in the clinical field where optical methods of determination are more suitable. Murexide, however, is also suitable for the colorimetric determination of calcium since in the alkaline range between pH 10.5 and 13 it enters into a color reaction with calcium, which can be measured very well by colorimetry.

It is, however, difficult to prepare an alkaline murexide solution suitable for this method of determination. While it is possible to produce dilute aqueous murexide solutions, these are very unstable and subject to rapid changes with regard to the murexide content. Therefore, such solutions are not suitable as prepared reagents.

It has been found that murexide is also soluble in methanol and can also be dissolved by ethanol and other monovalent alcohols if certain salts are added to these alcohols. But if these solutions are brought into the alkaline range, for example by the addition of alkali metal hydroxide or alkali metal alcoholate, the murexide precipitates. It is, therefore, impossible to prepare an alkaline murexide reagent on this basis.

It has now surprisingly been found that the above disadvantages are substantially eliminated when proceeding in accordance with the instant invention.

Essentially, the instant invention provides a reagent for the determination of calcium comprising a solution of murexide in at least one polyvalent alcohol (including bivalent alcohols) also containing alkali metal alcoholate.

The invention also comprises methods of preparing such a reagent. Further, the instant invention provides a method for determining calcium.

The solvent of the reagent of the invention consists, as already mentioned, of a bivalent or polyvalent alcohol. Examples of suitable bivalent alcohols are ethylene glycol, propylene glycol and higher alkyl glycols, polycondensation products on a basis of ethylene oxide or propylene oxide, and mixtures thereof, such as, for example, diethylene glycol, triethylene glycol, dipropylene glycol, and so forth. Examples of alcohols with more than two OH groups which may be used within the scope of the invention are glycerin, erythritol, pentaerythritol, pentaglycerin, etc. Mixtures of the polyvalent alcohols may also be used. Such mixtures may be desirable in order to reduce the viscosity or to liquefy polyvalent alcohols which are solid at normal temperature. Also, it is possible for this purpose to use monovalent alcohols such as methanol, ethanol, propanol, butanol and the like, the amount of the polyvalent alcohol not exceeding about 30% with reference to the sum of monovalent and polyvalent alcohol. In the individual case it is easy to determine by experiment up to what content of monovalent alcohols the necessary stability of the reagent will be preserved.

The content of murexide in the reagent of the invention ranges generally between about 0.01 and about 2 g/l. Less than the minimum limit stated is impractical because in that case too much of the reagent of the invention would have to be used in the calcium determination to be sure that all of the calcium will enter the reaction. To exceed the maximum murexide content is uneconomical and may reduce the shelf life of the reagent. The preferred range of the murexide content is between 0.03 and 0.2 grams per liter of reagent solution.

The alkali metal alcoholate content must be so great that the pH value of the reagent after the addition of water will be within the above-stated range. The amount depends not only on the desired final pH value but also to a certain extent on the amount of water that is added to the reagent of the invention for the performance of the calium determination. Good results are generally obtained when the content is between 0.01 and 0.2 mole of alkali alcoholate per liter of reagent. A preferred range is between 0.03 and 0.12 mole per liter.

The alkali alcoholate may be partially replaced by alkali hydroxide. Preferably, however, the alkali hydroxide content will be less than 10 percent of the alkali alcoholate content. Sodium, potassium and lithium are preferred as the alkali metal.

The preparation of the reagent of the invention may be performed either by adding the alkali metal alcoholate as such to the polyvalent alcohol or alcohol mixture and dissolving it therein or by bringing the alkali metal in metallic form into reaction with the polyvalent alcohol thus forming the desired alcoholate in situ. It is desirable not to add the murexide to the solution and dissolve it therein until after the addition of the alkali metal alcoholate or of the alkali metal as the case may be.

The reagent of the invention is very stable and can be stored for many months without variation of the murexide content. Since the reagent does not attack glass, it may be kept in glass vessels. Nor is it necessary to take special steps for the exclusion of moisture, because the alcoholate reacts with traces of water immediately with the formation of alkali metal hydroxide and alcohol, and the traces of water are removed thereby.

To perform the colorimetric determination of calcium, a certain amount of water and the specimen containing calcium ions are added to the reagent of the invention. Immediately, a color will develop whose intensity will be proportional to the amount of calcium put in. The coloration may easily be determined by means of optical apparatus. The amount of water added may be, for example, from one to ten times the volume of the reagent, depending essentially on the murexide content of the reagent. In the case of a reagent composition within the preferred range, the amount of water to be added will best be between about 5 and about 5 volumes per volume of reagent. The determination may be performed outside of the above-stated range, although usually no advantage will be achieved thereby.

The following examples are illustrative of, but not limitative of, the invention.

EXAMPLE 1

200 mg of sodium metal was reacted in 250 ml of ethylene glycol in a 500 ml Erlenmeyer flask with a ground glass stopper. After the reaction ended and the metal was completely dissolved, 40 mg of murexide was added and dissolved with heating. 5 ml of the solution thus obtained produced an extinction of 0.320 in a 1 cm cell in the Zeiss-Elko II Photometer using a metal filament lamp and filter S 57. Then the entire solution was kept for 52 days at 105° to 110°C. Then the extinction was again determined in the same manner as described. The value found was 0.322.

EXAMPLE 2

6 g of sodium ethylate was dissolved in 500 ml glycerin. Then 0.1 g of murexide was added and dissolved.

1 ml of the stock reagent thus obtained was mixed with 5 ml of water. The pH value of the solution then amounted to 12.5. After the addition of a solution containing about 5 to about 100 micrograms of calcium ions a coloration developed which was directly proportional to the calcium content.

EXAMPLE 3

4 g of metallic potassium was reacted in 350 ml of propylene glycol. Then 0.1 g of murexide was dissolved in the solution thus obtained. 150 ml of absolute ethanol was then added to reduce the viscosity. One milliliter of the reagent thus obtained was placed in each of a number of ordinary commercial stoppered containers. Through the addition of 5 ml of water and 0.1 ml of blood serum a color was obtained whose intensity was directly proportional to the amount of calcium contained in the blood serum.

It will be understood that the specification and examples are illustrative but not limitative of the present invention and that other embodiments within the spirit and scope of the invention will suggest themselves to those skilled in the art.

What is claimed is:

1. Reagent for calcium determination comprising a solution of murexide in at least one polyvalent alcohol containing sufficient alkali metal alcoholate to have a pH value of from 10.5 to 13 in aqueous solution.

2. Reagent as claimed in claim 1 wherein the reagent additionally contains up to 30 percent by volume of the total solution, of a monovalent alcohol.

3. Reagent as claimed in claim 1 wherein the solution contains from 0.01 to 2 grams per liter of murexide and from 0.01 to 0.2 mole per liter of alkali metal alcoholate.

4. Reagent as claimed in claim 1 wherein said polyvalent alcohol is at least one of ethylene glycol and propylene glycol.

5. Reagent as claimed in claim 1 wherein said polyvalent alcohol is at least one of diethylene glycol, triethylene glycol and dipropylene glycol.

6. Reagent as claimed in claim 1 wherein said polyvalent alcohol is at least one of glycerin, erythritol, pentaerythritol and pentaglycerin.

7. Method of preparing a reagent as claimed in claim 1, which comprises first dissolving an alkali metal alcoholate or metallic alkali metal in the polyvalent alcohol, and then adding and dissolving murexide therein.

8. Method of determining calcium colorimetrically, which method comprises contacting a sample suspected of containing calcium with a reagent as claimed in claim 1 and measuring the intensity or absence of developing coloration as a measure of the calcium content in the sample.

9. Method as claimed in claim 8 wherein said reagent additionally contains up to 30 percent by volume of monovalent alcohol.

10. Method as claimed in claim 8 wherein said composition contains from 0.01 to 2 grams per liter of murexide and from 0.01 to 0.2 mole per liter of alkali metal alcoholate.

11. Method as claimed in claim 8 wherein said polyvalent alcohol in said reagent is at least one of ethylene glycol, propylene glycol, diethylene glycol, triethylene glycol, dipropylene glycol, glycerin, erythritol, pentaerythritol and pentaglycerin.

* * * * *